(12) United States Patent
Bammann et al.

(10) Patent No.: US 10,202,197 B2
(45) Date of Patent: Feb. 12, 2019

(54) AIRCRAFT AIR CONDITIONING SYSTEM WITH AN ELECTRICALLY DRIVEN AMBIENT AIR COMPRESSOR AND METHOD FOR OPERATING SUCH AN AIRCRAFT AIR CONDITIONING SYSTEM

(71) Applicant: Airbus Operations GmbH, Hamburg (DE)

(72) Inventors: Holger Bammann, Hamburg (DE); Frank Klimpel, Hamburg (DE); Tim Giese, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 3 days.

(21) Appl. No.: 15/465,242

(22) Filed: Mar. 21, 2017

(65) Prior Publication Data
US 2017/0275004 A1    Sep. 28, 2017

(30) Foreign Application Priority Data
Mar. 24, 2016  (DE) .................. 10 2016 204 911

(51) Int. Cl.
*B64D 13/08* (2006.01)
*F25B 49/02* (2006.01)
(Continued)

(52) U.S. Cl.
CPC ............. *B64D 13/08* (2013.01); *B64D 13/04* (2013.01); *F25B 9/004* (2013.01); *F25B 9/06* (2013.01);
(Continued)

(58) Field of Classification Search
CPC .... B64D 2013/0618; B64D 2013/0648; B64D 2013/0688
See application file for complete search history.

(56) References Cited

U.S. PATENT DOCUMENTS 5,461,882 A * 10/1995 Zywiak .............. B60H 1/00007
62/401
6,948,325 B1    9/2005 Axe et al.
(Continued)

FOREIGN PATENT DOCUMENTS

DE    102008053320    5/2010
DE    102010034830    2/2012
(Continued)

OTHER PUBLICATIONS

German Search Report, dated Jan. 27, 2017, priority document.

*Primary Examiner* — Christopher R Zerphey
(74) *Attorney, Agent, or Firm* — Greer, Burns & Crain, Ltd.

(57) ABSTRACT

An aircraft air conditioning system comprising an ambient air supply line with a first end connected to an ambient air inlet and a second end connected to a mixing chamber. A first electrically driven ambient air compressor in the ambient air supply line compresses the ambient air flowing therethrough. A first ambient air branch line branches off from the ambient air supply line upstream of the first ambient air compressor and rejoins the supply line downstream of the air compressor. A second ambient air compressor in the first ambient air branch line compresses the ambient air flowing therethrough. A cabin exhaust air line has a first end connected to an air conditioned aircraft area. A cabin exhaust air turbine in the exhaust air line is driven by the exhaust air flowing through the cabin exhaust air line and is coupled to drive the second ambient air compressor.

15 Claims, 1 Drawing Sheet

(51) Int. Cl.
    *F25B 9/06*      (2006.01)
    *F25B 9/08*      (2006.01)
    *B64D 13/04*     (2006.01)
    *F25B 9/00*      (2006.01)
    *B64D 13/06*     (2006.01)

(52) U.S. Cl.
    CPC ................ *F25B 9/08* (2013.01); *F25B 49/02* (2013.01); *B64D 2013/0618* (2013.01); *B64D 2013/0648* (2013.01); *B64D 2013/0688* (2013.01); *F25B 2600/2515* (2013.01)

(56) References Cited

U.S. PATENT DOCUMENTS

| | | | |
|---|---|---|---|
| 8,333,078 B2 | 12/2012 | Kelnhofer | |
| 9,003,814 B2 * | 4/2015 | Zywiak | B64D 13/06 62/401 |
| 9,809,314 B2 * | 11/2017 | Bammann | B64D 13/06 |
| 2003/0051492 A1 * | 3/2003 | Hartenstein | B64D 13/06 62/172 |
| 2013/0160472 A1 | 6/2013 | Klimpel et al. | |
| 2013/0269327 A1 | 10/2013 | Keppeler | |
| 2013/0269374 A1 | 10/2013 | Kelnhofer | |
| 2014/0295277 A1 | 10/2014 | Yoshida et al. | |
| 2016/0083100 A1 | 3/2016 | Bammann et al. | |

FOREIGN PATENT DOCUMENTS

| | | |
|---|---|---|
| EP | 2651763 | 10/2013 |
| EP | 2786935 | 10/2014 |
| EP | 2998223 | 3/2016 |
| EP | 2998224 | 3/2016 |
| WO | 2012022758 | 2/2012 |

* cited by examiner

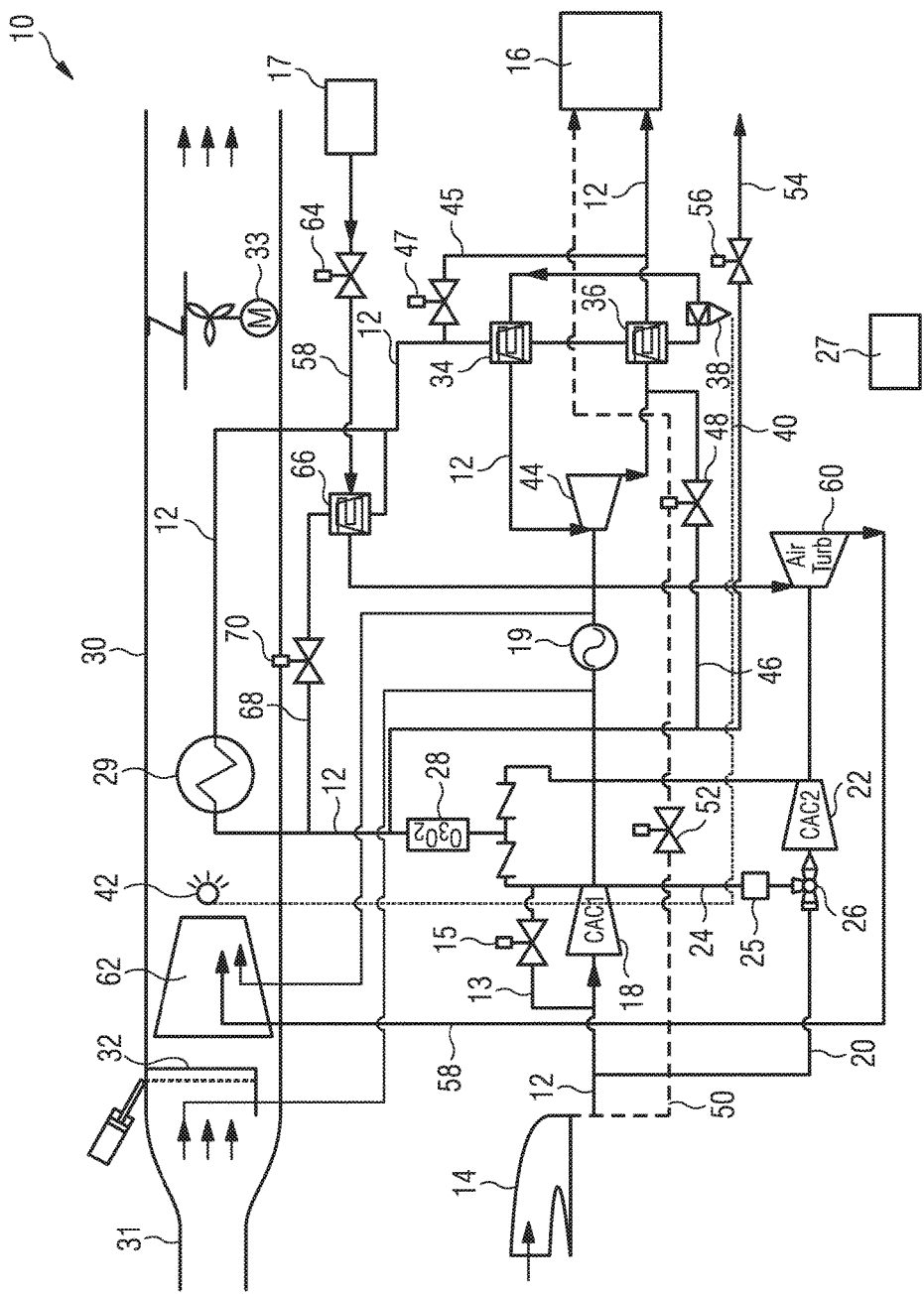

AIRCRAFT AIR CONDITIONING SYSTEM WITH AN ELECTRICALLY DRIVEN AMBIENT AIR COMPRESSOR AND METHOD FOR OPERATING SUCH AN AIRCRAFT AIR CONDITIONING SYSTEM

CROSS-REFERENCES TO RELATED APPLICATIONS

This application claims the benefit of the German patent application No. 10 2016 204 911.9 filed on Mar. 24, 2016, the entire disclosures of which are incorporated herein by way of reference.

BACKGROUND OF THE INVENTION

The invention relates to an aircraft air conditioning system with an electrically driven ambient air compressor and a method for operating such an aircraft air conditioning system.

In commercial aircraft, so-called air-based air conditioning systems, such as are described, for example, in DE 10 2008 053 320 B4 and U.S. Pat. No. 8,333,078 B2 or EP 2 651 763 A2 and US 2013/269327 A1, are normally used at present for air conditioning of the aircraft cabin. An aircraft air conditioning system is used to set and maintain a desired pressure, desired temperature and desired air humidity in an aircraft cabin. Moreover, the aircraft air conditioning system supplies adequate fresh air to the aircraft cabin to ensure that a prescribed minimum quantity of fresh air is present in the aircraft cabin. Finally, the aircraft air conditioning system ensures that the aircraft cabin is kept at a desired pressure, which is increased compared with the ambient pressure at the flight altitude of the aircraft, in flight mode of the aircraft.

Air-based aircraft air conditioning systems normally comprise an air conditioning unit, to which compressed process air is supplied by the engines of the aircraft, a separate compressor or an auxiliary power unit (APU). In flight mode of the aircraft, engine bleed air is mainly used to provide the air conditioning unit of the aircraft air conditioning system with compressed process air. In ground operation of the aircraft, the air conditioning unit of the aircraft air conditioning system is normally supplied, on the other hand, with compressed process air from the auxiliary power unit or an aircraft-external air generating unit. In the air conditioning unit, the process air is cooled and expanded on flowing through at least one heat exchanger unit as well as various compression and expansion units. Cooled process air exiting the air conditioning unit is finally conducted into a mixing chamber and is mixed there with recirculation air removed from an aircraft area to be air conditioned. The mixed air from the mixing chamber is conducted via corresponding mixed air lines into the aircraft area to be air conditioned, which can be in the form of a passenger cabin, a cockpit, a cargo hold, a crew rest room or similar and divided into several climate zones.

DE 10 2010 034 830 A1 and WO 2012/022758 A1 describe an aircraft air conditioning system in which the compressed process air, which is taken from an engine of the aircraft, is cooled by the transfer of heat to a coolant flowing through a cooling circuit. A turbine, which serves to expand the compressed process air before it is supplied to an aircraft cabin, is used to drive a compressor arranged in the cooling circuit.

SUMMARY OF THE INVENTION

An object of the invention is to provide an aircraft air conditioning system that makes it possible to provide an aircraft area to be air conditioned of an aircraft equipped with the aircraft air conditioning system with air conditioned ambient air in a particularly energy-efficient manner. The object of the invention is also to specify a method for operating such an aircraft air conditioning system.

An aircraft air conditioning system comprises an ambient air supply line configured to have ambient air flow through it. The ambient air line has a first end, which is connected to an ambient air inlet, and a second end, which is connected to a mixing chamber of the aircraft air conditioning system. The ambient air inlet may be designed in the form of a scoop inlet, for example, and comprise an opening provided in an outer skin of an aircraft equipped with the aircraft air conditioning system, which opening connects the ambient air supply line directly to the ambient atmosphere. However, it is also conceivable to connect the first end of the ambient air supply line to a ram air duct, in order to conduct ram air flowing through the ram air duct into the ambient air supply line.

The aircraft air conditioning system further comprises a first ambient air compressor, which is arranged in the ambient air supply line and is configured to compress the ambient air flowing through the ambient air supply line. In particular, the first ambient air compressor is configured to compress the ambient air flowing through the ambient air supply line to an increased pressure, which makes it possible to conduct the ambient air—after further processing—into the mixing chamber of the aircraft air conditioning system, where the ambient air can be mixed with recirculation air removed from an aircraft area to be air conditioned, for example an aircraft cabin. Mixed air produced in the mixing chamber is preferably used to air condition the aircraft area to be air conditioned.

An electric machine is configured to drive the first ambient air compressor. The electric machine may be designed in the form of an electrically driven air cycle machine, which may comprise a two-stage turbine and/or a variable jet arrangement to cover the entire required operating range of the electric machine. Other configurations of the electric machine are also conceivable. It is only essential that the first ambient air compressor is driven exclusively by electrical energy. Due to this, the extraction of bleed air from an engine of the aircraft to drive the first ambient air compressor can be eliminated. The fuel consumption of the engine can be reduced thereby. The aircraft air conditioning system can therefore be operated especially energy-efficiently.

The aircraft air conditioning system further comprises a first ambient air branch line, which branches off from the ambient air supply line upstream of the first ambient air compressor and rejoins the ambient air supply line downstream of the first ambient air compressor, i.e., it "bypasses" the first ambient air compressor. The terms "upstream" and "downstream" refer here to the flow direction of the ambient air through the ambient air supply line. Arranged in the first ambient air branch line is a second ambient air compressor, which is configured to compress ambient air flowing through the first ambient air branch line. The second ambient air compressor is preferably configured to compress the ambient air flowing through the first ambient air branch line to an increased pressure, which makes it possible to conduct the ambient air—following further processing—into the mixing chamber of the aircraft air conditioning system.

A cabin exhaust air line of the aircraft air conditioning system is configured to have cabin exhaust air flow through it and has a first end, which is connectable to an aircraft area to be air conditioned, in particular, an aircraft cabin. A cabin exhaust air control valve may be arranged in the cabin exhaust air line, which valve may be configured to control a cabin exhaust air flow through the cabin exhaust air line. Arranged in the cabin exhaust air line is a cabin exhaust air turbine, which is configured to be driven by the cabin exhaust air flowing through the cabin exhaust air line. Upon flowing through the cabin exhaust air turbine, the cabin exhaust air is expanded and consequently cooled.

The cabin exhaust air turbine is coupled to the second ambient air compressor to drive the second ambient air compressor. For example, the cabin exhaust air turbine and the second ambient air compressor may be arranged on a common shaft. In the aircraft air conditioning system, the cabin exhaust air removed from the aircraft cabin is thus used to drive the second ambient air compressor arranged in the first ambient air branch line independently of the electrically driven first ambient air compressor. An adequate quantity of compressed ambient air can thereby be supplied to the mixing chamber of the aircraft air conditioning system even in flight mode of the aircraft at great flight altitudes, when the pressure in the aircraft environment and consequently the pressure of the ambient air flowing through the ambient air supply line are low. Moreover, the use of the energy contained in the cabin exhaust air to drive the cabin exhaust air turbine and consequently to drive the second ambient air compressor reduces the electrical energy required to drive the first ambient air compressor. This permits an especially energy-efficient operation of the aircraft air conditioning system.

In a preferred embodiment of the aircraft air conditioning system, a second end of the cabin exhaust air line opens into a ram air duct. The second end of the cabin exhaust air line is preferably connected to an ejector arranged in the ram air duct, which ejector is configured to eject the cabin exhaust air flowing through the cabin exhaust air line into the ram air duct. The ejector is preferably able to eject the expanded and consequently very cold cabin exhaust air flowing through the cabin exhaust air line downstream of the cabin exhaust air turbine at an increased velocity and an increased pressure into the ram air duct. The term "downstream" refers here to the flow direction of the cabin exhaust air through the cabin exhaust air line. The cooling capacity of the ram air flowing through the ram air duct is thereby increased, so that the ram air duct can be operated especially efficiently, i.e., with a low ram air flow. The aerodynamic loss caused by the ram air duct, i.e., the ram air flow through the ram air duct, can consequently be reduced.

The ram air duct may be a ram air duct with a combined NACA/scoop inlet described in EP 2 786 935 A1 or US 2014/0295277 A1. The scoop inlet of the ram air duct may then be connected, for example, to the ambient air supply line. In the area of an outlet, the ram air duct is preferably connected to an outlet flap and an actuator in order to increase the ram pressure in the ram air duct if required by suitable control of the outlet flap by the actuator. The NACA inlet of the ram air duct is preferably optimized for the flight mode of an aircraft equipped with the aircraft air conditioning system. An inlet flap provided in the area of the ram air duct inlet that can be controlled by a corresponding actuator is therefore preferably used substantially to control the supply of air to the ram air duct in ground operation of an aircraft equipped with the aircraft air conditioning system.

An electrically driven fan may be provided in the ram air duct, which fan serves to convey ram air through the ram air duct in ground operation of the aircraft. A shut-off valve may be provided in the ram air duct in order to conduct the ram air flowing through the ram air duct past the fan in flight mode of the aircraft when no fan operation is required. Alternatively to this, a fan with variable fan blades may also be used. Finally, it is also conceivable to provide a jet pump instead of an electrically driven fan in the ram air duct, in order to convey ram air through the ram air duct in ground operation of the aircraft. The jet pump may be driven by compressed ambient air, for example, which may be taken from the second ambient air compressor.

The aircraft air conditioning system preferably further comprises a connection line that branches off from the ambient air supply line downstream of the first ambient air compressor and joins the first ambient air branch line upstream of the second ambient air compressor. The terms "downstream" and "upstream" refer here to the flow direction of the ambient air through the ambient air supply line and the first ambient air branch line. The first ambient air compressor and the second ambient air compressor may be connected in series to one another via the connection line, i.e., compressed ambient air that exits the first ambient air compressor may be conducted into the second ambient air compressor via the connection line and compressed further there.

A heat exchanger may be arranged in the connection line that cools the ambient air flowing through the connection line downstream of the first ambient air compressor before it is supplied to the second ambient air compressor. The heat exchanger acts as an intermediate cooler, which in serial operation of the ambient air compressors cools the ambient air flow emerging from the first ambient air compressor before it is supplied to the second ambient air compressor. The operating efficiency of the second ambient air compressor can be increased by this and the overall energy requirement to compress the ambient air consequently reduced.

An ambient air supply control valve may be configured to control the flow of ambient air through the connection line and the first ambient air branch line. The ambient air supply control valve may be designed in the form of a three-way valve, for example, which is arranged in the region of an opening of the connection line into the first ambient air branch line. The first ambient air compressor and the second ambient air compressor can then be connected, as required, in series or parallel to one another by the ambient air supply control valve. The ambient air supply to the second ambient air compressor can further be interrupted by the ambient air control valve.

An electronic control unit of the aircraft air conditioning system is preferably configured to control the operation of the ambient air supply control valve in such a way that ambient air flows through the first ambient air compressor and the second ambient air compressor in parallel or in series as a function of the operating state of the aircraft air conditioning system. Furthermore, the electronic control unit may be configured to control the operation of the ambient air supply control valve in such a way that the supply of ambient air to the second ambient air compressor is interrupted as a function of the operating state of the aircraft air conditioning system. A parallel operation of the two ambient air compressors enables the ram air requirement for further processing of the ambient air emerging from the ambient air compressors to be reduced, but leads to a slightly higher requirement for electrical energy to drive the first ambient air compressor.

The electronic control unit may further be configured to control the operation of ambient air supply control valve and the operation of a cabin exhaust air control valve arranged in the cabin exhaust air line upstream of the cabin exhaust air turbine as a function of an ambient air requirement of the aircraft air conditioning system. The term "upstream" refers here to the flow direction of the cabin exhaust air through the cabin exhaust air line. For example, the electronic control unit may control the ambient air supply control valve and/or the cabin exhaust air control valve so that the quantity of ambient air compressed by the second ambient air compressor is increased in response to an increased ambient air requirement of the aircraft air conditioning system. In a similar manner, the electronic control unit may control the ambient air supply control valve and/or the cabin exhaust air control valve so that the quantity of ambient air compressed by the second ambient air compressor is decreased or even reduced to zero if the ambient air requirement of the aircraft air conditioning system declines.

In a particularly preferred embodiment of the aircraft air conditioning system, the electronic control unit is configured to control the operation of the ambient air supply control valve and the cabin exhaust air control valve in a synchronized manner as a function of the ambient air requirement of the aircraft air conditioning system. This facilitates particularly efficient operation of the second ambient air compressor, as it can be ensured by this that an adequate quantity of cabin exhaust air is supplied to the cabin exhaust air turbine to produce the necessary drive energy to drive the second ambient air compressor and consequently to provide an adequate quantity of compressed ambient air by the second ambient air compressor.

A compressor air recirculation line may branch off from the ambient air supply line downstream of the first ambient air compressor and rejoin the ambient air supply line upstream of the first ambient air compressor. The terms "downstream" and "upstream" refer here to the flow direction of the ambient air through the ambient air supply line. Compressed air emerging from the first ambient air compressor may be returned to the first ambient air compressor via the compressor air recirculation line and be compressed again. This makes it possible to improve the performance of the aircraft air conditioning system, especially if the aircraft air conditioning system is to be used for heating purposes. A compressor air recirculation valve may be arranged in the compressor air recirculation line and be configured to control a flow of compressed ambient air emerging from the first ambient air compressor through the compressor air recirculation line back into the ambient air supply line downstream of the first ambient air compressor.

The aircraft air conditioning system may further comprise a cabin exhaust air reheater, which may be arranged in the cabin exhaust air line upstream of the cabin exhaust air turbine. The term "upstream" refers here to the flow direction of the cabin exhaust air through the cabin exhaust air line. By heating the cabin exhaust air flowing through the cabin exhaust air line before supplying it to the cabin exhaust air turbine, the drive energy potential of the cabin exhaust air turbine can be increased. Moreover, the risk that the cabin exhaust air flowing through the cabin exhaust air line in the area of an inlet or an outlet of the cabin exhaust air turbine contains liquid water can be reduced by this.

The cabin exhaust air reheater is preferably coupled thermally to a second ambient air branch line, which branches off from the ambient air supply line downstream of the first ambient air compressor and the second ambient air compressor and rejoins the ambient air supply line downstream of the cabin exhaust air reheater. The term "downstream" refers here to the flow direction of the ambient air through the ambient air supply line. Heat from the compressed ambient air flowing through the second ambient air branch line can consequently be transferred to the cabin exhaust air flow flowing through the cabin exhaust air line in the cabin exhaust air reheater. A bypass valve is preferably arranged in the second ambient air branch line to control the flow of compressed ambient air through the second ambient air branch line. The supply of compressed ambient air to the cabin exhaust air reheater and consequently the heating capacity of the cabin exhaust air reheater can thus be controlled by suitable control of the bypass valve.

The aircraft air conditioning system may further comprise an ambient air cooler, which may be arranged in the ambient air supply line downstream of the first ambient air compressor and the second ambient air compressor. The term "downstream" refers here to the flow direction of the ambient air through the ambient air supply line. The ambient air cooler is preferably thermally coupled to the ram air duct, in order to transfer heat from the compressed ambient air flowing through the ambient air supply line to a ram air flow flowing through the ram air duct. The ambient air cooler is preferably designed in the form of a heat exchanger and is arranged in the ram air duct.

An ambient air reheater may be arranged in the ambient air supply line downstream of the ambient air cooler. The flow of ambient air cooled in the ambient air cooler may be reheated to an increased temperature by the ambient air reheater. A condenser may also be provided in the ambient air supply line downstream of the ambient air reheater. The ambient air flowing through the ambient air supply line may be cooled to below the dew point of water in the condenser. Finally, a water separator may be provided in the ambient air supply line downstream of the condenser. The term "downstream" refers here to the flow direction of the ambient air through the ambient air supply line. The ambient air reheater, the condenser and the water separator form a high-pressure water separation arrangement, which ensures that no free water is contained any longer in the ambient air flow flowing through the ambient air supply line.

Water separated from the ambient air flow in the water separator may be conducted into the ram air duct to be discharged into an ambient atmosphere together with the ram air flowing through the ram air duct. In a preferred embodiment of the aircraft air conditioning system, liquid water separated from the ambient air flow by the water separator is injected into the ram air duct by a water injection nozzle. The water partly evaporates and cools the ram air flowing through the ram air duct.

The aircraft air conditioning system may further comprise an ambient air turbine, which may be arranged in the ambient air supply line downstream of the water separator. The term "downstream" refers here to the flow direction of the ambient air through the ambient air supply line. The high-pressure water separation arrangement connected upstream of the ambient air turbine and comprising the ambient air reheater, the condenser and the water separator ensures that no further liquid water is contained in the ambient air flow flowing through the ambient air supply line before it is supplied to the ambient air turbine. On flowing through the ambient air turbine, the ambient air is expanded and consequently cooled. The ambient air turbine is preferably coupled to the first ambient air compressor, in order to drive the first ambient air compressor. For example, the ambient air turbine and the first ambient air compressor may be arranged on a common shaft. An arrangement of this kind enables a relief of the electric machine to drive the first ambient air compressor and thus a particularly energy-efficient operation of the aircraft air conditioning system.

The ambient air reheater is preferably thermally coupled to a section of the ambient air supply line which is arranged downstream of the water separator. Heat from the ambient air flow that flows through the section of the ambient air supply line which is arranged downstream of the water separator may thereby be transferred to the ambient air flow flowing through the ambient air reheater. The condenser may be thermally coupled to a section of the ambient air supply line which is arranged downstream of the ambient air turbine. Heat from the ambient air flow flowing through the condenser may thereby be transferred to the ambient air flow flowing through the section of the ambient air supply line which is arranged downstream of the ambient air turbine. The term "downstream" refers here to the flow direction of the ambient air through the ambient air supply line.

A ventilation line of the aircraft air conditioning system may branch off from the ambient air supply line upstream of the ambient air turbine and, in particular, upstream of the ambient air reheater and rejoin the ambient air supply line downstream of the ambient air turbine. The terms "upstream" and "downstream" refer here to the flow direction of the ambient air through the ambient air supply line. A ventilation valve may be arranged in the ventilation line, which valve may be configured to control the flow of ambient air through the ventilation line. The ventilation line thus "bypasses" the high-pressure water separation arrangement comprising the ambient air reheater, the condenser and the water separator and can be used in flight mode of an aircraft equipped with the aircraft air conditioning system, in particular, at great flight altitudes with a low ambient pressure, to increase the permeability of the ambient air supplied to the mixing chamber of the aircraft air conditioning system and consequently to reduce the energy outlay required to compress the ambient air.

A trim air line may branch off from the ambient air supply line between the first ambient air compressor and the ambient air cooler and rejoin the ambient air supply line downstream of the ambient air turbine. The term "downstream" refers here to the flow direction of the ambient air through the ambient air supply line. The trim air line preferably joins the ambient air supply line between the ambient air turbine and the condenser. Ambient air at an increased pressure and increased temperature can be added to the ambient air emerging from the ambient air turbine via the trim air line. Ambient air at a desired temperature and desired pressure can consequently be supplied to the mixing chamber of the aircraft air conditioning system. A trim air valve arranged in the trim air line is preferably configured to control the flow of hot compressed ambient air through the trim air line.

The aircraft air conditioning system preferably further comprises an emergency ventilation line, which connects the ambient air inlet to the mixing chamber of the aircraft air conditioning system. In the event of a failure of the aircraft air conditioning system, for example, ambient air entering the aircraft air conditioning system via the ambient air inlet can be conducted via the emergency ventilation line directly into the mixing chamber of the aircraft air conditioning system. Thereby, it can be ensured that at least a minimum supply of ambient air to the mixing chamber is guaranteed in all operating situations of the aircraft air conditioning system. An emergency ventilation valve may be arranged in the emergency ventilation line that is preferably configured to control the flow of ambient air through the emergency ventilation line, i.e., to open the emergency ventilation line if required for ambient air to flow through.

Finally, the aircraft air conditioning system may comprise a further trim air line branching off from the trim air line. The further trim air line may be connectable to an aircraft area to be heated, so that hot compressed ambient air can be supplied to the aircraft area to be heated via the further trim air line, bypassing the mixing chamber of the aircraft air conditioning system. To control the flow of hot compressed ambient air through the further trim air line, a further trim air valve is preferably arranged in the further trim air line.

In a method for operating an aircraft air conditioning system, ambient air is conducted through an ambient air supply line, which comprises a first end connected to an ambient air inlet and a second end connected to a mixing chamber of the aircraft air conditioning system. The ambient air flowing through the ambient air supply line is compressed in a first ambient air compressor arranged in the ambient air supply line. The first ambient air compressor is driven by an electric machine. Ambient air is further conducted through a first ambient air branch line, which branches off from the ambient air supply line upstream of the first ambient air compressor and rejoins the ambient air supply line downstream of the first ambient air compressor. The ambient air flowing through the first ambient air branch line is compressed in a second ambient air compressor arranged in the first ambient air branch line. Cabin exhaust air is conducted through a cabin exhaust air line, which comprises a first end connectable to an aircraft area to be air conditioned. A cabin exhaust air turbine, which is arranged in the cabin exhaust air line and coupled to the second ambient air compressor, is driven by the cabin exhaust air flowing through the cabin exhaust air line. The second ambient air compressor is driven by the cabin exhaust air turbine.

A second end of the cabin exhaust air line preferably opens into a ram air duct and is connected, in particular, to an ejector arranged in the ram air duct, which ejector ejects the cabin exhaust air flowing through the cabin exhaust air line into the ram air duct.

In a preferred embodiment of the method, ambient air is conducted through a connection line, which branches off from the ambient air supply line downstream of the first ambient air compressor and joins the first ambient air branch line upstream of the second ambient air compressor. The flow of ambient air through the connection line and the first ambient air branch line may be controlled by an ambient air supply control valve. The operation of the ambient air supply control valve may be controlled so that ambient air flows through the first ambient air compressor and the second ambient air compressor in parallel or in series as a function of the operating state of the aircraft air conditioning system.

The operation of the ambient air supply control valve and the operation of a cabin exhaust air control valve arranged in the cabin exhaust air line downstream of the cabin exhaust air turbine may be controlled as a function of an ambient air requirement of the aircraft air conditioning system and, in particular, in a synchronized manner.

A heat exchanger may be arranged in the connection line, which heat exchanger may cool the ambient air flowing through the connection line downstream of the first ambient air compressor before it is supplied to the second ambient air compressor.

In a preferred embodiment of the method, compressed ambient air emerging from the first ambient air compressor is conducted through a compressor air recirculation line, which branches off from the ambient air supply line downstream of the first ambient air compressor and rejoins the ambient air supply line upstream of the first ambient air compressor. A flow of compressed ambient air emerging from the first ambient air compressor through the compressor air recirculation line back into the ambient air supply line downstream of the first ambient air compressor is preferably controlled by a compressor air recirculation valve arranged in the compressor air recirculation line.

Heat from the compressed ambient air flowing through the second ambient air branch line is preferably transferred to the cabin exhaust air flow flowing through the cabin exhaust air line by a cabin exhaust air reheater arranged in the cabin exhaust air line upstream of the cabin exhaust air turbine. The cabin exhaust air reheater is preferably thermally coupled to a second ambient air branch line, which branches off from the ambient air supply line downstream of the first ambient air compressor and the second ambient air compressor and rejoins the ambient air supply line downstream of the cabin exhaust air reheater. The flow of compressed ambient air through the second ambient air branch line is preferably controlled by a bypass valve arranged in the second ambient air branch line.

Heat from the compressed ambient air flowing through the ambient air supply line may be transferred to a ram air flow flowing through a ram air duct by an ambient air cooler arranged in the ambient air supply line downstream of the first ambient air compressor and the second ambient air compressor. The ambient air cooler is preferably thermally coupled to the ram air duct for this purpose and, in particular, arranged in the ram air duct. Ambient air may be conducted through an ambient air reheater arranged in the ambient air supply line, in particular, downstream of the ambient air cooler, and heated in the ambient air reheater to an increased temperature. Ambient air may further be conducted through a condenser arranged in the ambient air supply line, in particular, downstream of the ambient air reheater, and in doing so be cooled to a temperature below the dew point of water. Moreover, ambient air may be conducted through a water separator arranged in the ambient air supply line, in particular, downstream of the condenser. In the water separator, free water can be separated from the ambient air flow. Finally, ambient air may be conducted into an ambient air turbine arranged downstream of the water separator and expanded and cooled. The first ambient air compressor may be driven by the ambient air turbine.

In the ambient air reheater, which may be thermally coupled to a section of the ambient air supply line which is arranged downstream of the water separator, heat from the ambient air flow that flows through the section of the ambient air supply line which is arranged downstream of the water separator may be transferred to the ambient air flow flowing through the ambient air reheater. In the condenser, which is thermally coupled to a section of the ambient air supply line which is arranged downstream of the ambient air turbine, heat from the ambient air flow flowing through the condenser may be transferred to the ambient air flow that flows through the section of the ambient air supply line which is arranged downstream of the ambient air turbine.

In a preferred embodiment of the method, ambient air may be conducted through a ventilation line, which branches off from the ambient air supply line downstream of the ambient air turbine and, in particular, upstream of the ambient air reheater and rejoins the ambient air supply line downstream of the ambient air turbine. The flow of ambient air through the ventilation line may be controlled by a ventilation valve arranged in the ventilation line. Hot compressed ambient air may be conducted through a trim air line, which branches off from the ambient air supply line between the first ambient air compressor and the ambient air cooler and rejoins the ambient air supply line downstream of the ambient air turbine. The flow of hot compressed ambient air through the trim air line may be controlled by a trim air valve arranged in the trim air line.

Ambient air may further be conducted through an emergency ventilation line, which connects the ambient air inlet to the mixing chamber of the aircraft air conditioning system. The flow of ambient air through the emergency ventilation line may be controlled by an emergency ventilation valve arranged in the emergency ventilation line. Finally, hot compressed ambient air may be conducted through a further trim air line, which branches off from the trim air line and is connectable to an aircraft area to be heated. The flow of hot compressed ambient air through the further trim air line may be controlled by a further trim air valve arranged in the further trim air line.

BRIEF DESCRIPTION OF THE DRAWINGS

A preferred embodiment of the invention is now explained in greater detail with reference to the enclosed schematic drawing, which in The FIGURE shows an air conditioning system for air conditioning an aircraft cabin.

DETAILED DESCRIPTION OF THE PREFERRED EMBODIMENTS

An aircraft air conditioning system 10 illustrated in the FIGURE comprises an ambient air supply line 12. The ambient air supply line 12 has a first end, which is connected to an ambient air inlet 14 designed in the form of a scoop inlet. Via the scoop inlet 14 ambient air can be taken from an air layer and supplied to the ambient air supply line 12, which lies above a boundary layer that builds up along an outer skin of the aircraft in flight mode of an aircraft equipped with the aircraft air conditioning system 10. A second end of the ambient air supply line 12 is connected to a mixing chamber 16 of the aircraft air conditioning system 10. In the mixing chamber 16, the ambient air supplied to the mixing chamber 16 through the ambient air supply line 12 is mixed with recirculation air, which is removed from an aircraft area 17 that is to be air conditioned in the form of an aircraft cabin. Mixed air produced in the mixing chamber 16 is finally supplied to the aircraft area 17 that is to be air conditioned in the form of an aircraft cabin.

The ambient air supplied via the ambient air inlet 14 to the aircraft air conditioning system 10 is conducted into a first ambient air compressor 18 arranged in the ambient air supply line 12. On flowing through the first ambient air compressor 18, the ambient air is compressed and thereby heated. A compressor air recirculation line 13 branches off from the ambient air supply line 12 downstream of the first ambient air compressor 18 and rejoins the ambient air supply line 12 upstream of the first ambient air compressor 18. Compressed air emerging from the first ambient air compressor 18 can be returned to the first ambient air compressor 18 via the compressor air recirculation line 13 and compressed again. A compressor air recirculation valve 15 arranged in the compressor air recirculation line 13 serves to control a flow of compressed ambient air emerging from the first ambient air compressor 18 through the compressor air recirculation line 13 back into the ambient air supply line 12 downstream of the first ambient air compressor 18.

The first ambient air compressor 18 is driven by an electric machine 19. In the embodiment of the aircraft air conditioning system 10 shown in the FIGURE, the electric machine 19 is designed in the form of an electrically driven air cycle machine, which ensures that the first ambient air compressor is driven exclusively by electrical energy.

A first ambient air branch line 20 branches off from the ambient air supply line 12 upstream of the first ambient air compressor 18 and rejoins the ambient air supply line 12 downstream of the first ambient air compressor 18. A second ambient air compressor 22 is arranged in the first ambient air branch line 20 and serves to compress the ambient air flowing through the first ambient air branch line 20 and consequently to heat it.

A connection line 24 branches off from the ambient air supply line 12 downstream of the first ambient air compressor 18 and joins the first ambient air branch line 20 upstream of the second ambient air compressor 22. The first ambient air compressor 18 and the second ambient air compressor 22 may be connected to one another in series via the connection line 24, so that compressed ambient air emerging from the first ambient air compressor 18 can be compressed further by the second ambient air compressor 22. Arranged in the connection line 24 is a heat exchanger 25, which cools the ambient air flowing through the connection line 24 downstream of the first ambient air compressor 18 before it is supplied to the second ambient air compressor 22.

An ambient air supply control valve 26 formed here in the form of a three-way valve is arranged in the area of an outlet of the connection line 24 into the ambient air supply line 12 and is configured to control the supply of ambient air to the second ambient air compressor 22. In particular, the flow of ambient air through the connection line 24 and the first ambient air branch line 20 can be controlled by the ambient air supply control valve 26 so that the first ambient air compressor 18 and the second ambient air compressor 22 can be connected to one another either in parallel or in series as required via the first ambient air branch line 20. In particular, the electronic control unit 27 controls the ambient air supply control valve 26 in such a way that ambient air flows in parallel or in series through the first ambient air compressor 18 and the second ambient air compressor 22 as a function of the operating state of the aircraft air conditioning system 10. In a series operation of the ambient air compressors 18, 20, the heat exchanger 25 acts as an intermediate cooler, which cools the ambient air flow emerging from the first ambient air compressor 18 before it is supplied to the second ambient air compressor 22. The operation of the ambient air supply control valve is controlled by an electronic control unit 27.

The ambient air flowing through the ambient air supply line 12 downstream of the ambient air compressors 18, 22 is first conducted through an ozone converter 28 and then supplied to an ambient air cooler 29. The ambient air cooler 29 is arranged downstream of the first ambient air compressor 18 and the second ambient air compressor 22 in the ambient air supply line 12 and coupled thermally to a ram air duct 30. In particular, the ambient air cooler 29 is designed in the form of a heat exchanger and arranged in the ram air duct 30. In the flow through the ambient air cooler 29, heat from the ambient air flowing through the ambient air supply line 12 is transferred to the ram air flowing through the ram air duct 30.

In flight mode of an aircraft equipped with the aircraft air conditioning system 10, ram air that is supplied to the ram air duct 30 via a ram air inlet 31 flows through the ram air duct 30. The supply of ram air to the ram air duct 30 is controlled by an actuator-operated inlet flap 32. In ground operation of the aircraft, on the other hand, ambient air which is conveyed through the ram air duct 30 by a fan 33 flows through the ram air duct 30. Instead of the fan 33, a jet pump can also be used to convey ram air through the ram air duct 30 in ground operation of the aircraft. The ram air flowing through the ram air duct 30 exits the ram air duct 30 via a ram air outlet. An actuator-operated outlet flap, which is not shown in the FIGURE, can be used both in flight mode and in ground operation of the aircraft to control the ram pressure in the ram air duct 30.

In the arrangement shown in the FIGURE, the ambient air inlet 14 and the ram air duct 30 are formed as separate facilities. However, it is also possible to form the ambient air inlet 14 and the ram air duct 30 in the form of a ram air duct with a combined NACA/scoop inlet, as described, for example, in EP 2 786 935 A1 or US 2014/0295277 A1.

After flowing through the ambient air cooler 29, the ambient air flowing through the ambient air supply line 12 is conducted through an ambient air reheater 34. On flowing through the ambient air reheater 34, the ambient air that was cooled in the ambient air cooler 29 is heated again. Downstream of the ambient air reheater 34, a condenser 36 is provided in the ambient air supply line 12. In the condenser 36, the ambient air flowing through the ambient air supply line 12 is cooled to below the dew point of water. Finally, a water separator 38 is provided in the ambient air supply line 12 downstream of the condenser 36. The ambient air reheater 34, the condenser 36 and the water separator 38 form a high-pressure water separation arrangement, which ensures that no free water is contained any longer in the ambient air flow flowing through the ambient air supply line.

Water separated from the ambient air flow in the water separator 38 is conducted into the ram air duct 30 via a water discharge line 40. In particular, the liquid water separated from the ambient air flow by the water separator 38 is injected into the ram air duct 30 by a water injection nozzle 42. The water partly evaporates in the process and cools the ram air flowing through the ram air duct 30. The water injection nozzle 42 is positioned, with reference to the flow direction of the ram air through the ram air duct 30, upstream of the ambient air cooler 29 in the ram air duct 30, in order to optimally utilize the cooling effect of the water injected into the ram air duct 30. Finally, the water is discharged together with the ram air flowing through the ram air duct 30 into the environment of the aircraft equipped with the aircraft air conditioning system 10.

The aircraft air conditioning system 10 further comprises an ambient air turbine 44, which is arranged in the ambient air supply line 12 downstream of the water separator 38. On flowing through the ambient air turbine 44, the ambient air is expanded and consequently cooled. The ambient air turbine 44 is coupled to the first ambient air compressor 18 to support the driving of the first ambient air compressor 18 by the electric machine 19. In the arrangement according to the FIGURE, the ambient air turbine 44, the electric machine 19 and the first ambient air compressor 18 are arranged on a common shaft.

The ambient air reheater 34 is thermally coupled to a section of the ambient air supply line 12 which is arranged downstream of the water separator 38. Heat from the ambient air flow that flows through the section of the ambient air supply line 12 which is arranged downstream of the water separator 38 can thereby be transferred to the ambient air flow flowing through the ambient air reheater 34. The condenser 36 is thermally coupled to a section of the ambient air supply line 12 which is arranged downstream of the ambient air turbine 44. Heat from the ambient air flow flowing through the condenser 36 can thereby be transferred to the ambient air flow that flows through the section of the ambient air supply line 12 which is arranged downstream of the ambient air turbine 44.

A ventilation line 45 of the aircraft air conditioning system 10 branches off from the ambient air supply line 12 upstream of the ambient air turbine 44 and, in particular, upstream of the ambient air reheater 34 and rejoins the ambient air supply line 12 downstream of the ambient air turbine 44. A ventilation valve 47 for controlling the flow of ambient air through the ventilation line 45 is arranged in the ventilation line. The ventilation line 45 "bypasses" the high-pressure water separation arrangement comprising the ambient air reheater 34, the condenser 36 and the water separator 38 and can be used in flight mode of an aircraft equipped with the aircraft air conditioning system 10, in particular, at great flight altitudes with a low ambient pressure, to increase the permeability of the ambient air supplied to the mixing chamber 16 of the aircraft air conditioning system 10.

A trim air line 46 branches off from the ambient air supply line 12 between the first ambient air compressor 18 and the ambient air cooler 29 and rejoins the ambient air supply line 12 downstream of the ambient air turbine 44. In particular, the trim air line 46 joins the ambient air supply line 12 between the ambient air turbine 44 and the condenser 36. Ambient air at an increased pressure and increased temperature can be added to the ambient air emerging from the ambient air turbine 44 via the trim air line 46. Ambient air at a desired temperature and desired pressure can consequently be supplied to the mixing chamber 16 of the aircraft air conditioning system 10. A trim air valve 48 arranged in the trim air line 46 serves to control the flow of hot compressed ambient air through the trim air line 46.

The aircraft air conditioning system 10 further comprises an emergency ventilation line 50, which connects the ambient air inlet 14 to the mixing chamber 16 of the aircraft air conditioning system 10. In the event of a failure of the aircraft air conditioning system 10, for example, ambient air entering the aircraft air conditioning system 10 via the ambient air inlet 14 can be conducted via the emergency ventilation line 50 directly into the mixing chamber 16 of the aircraft air conditioning system 10. An emergency ventilation valve 52 is arranged in the emergency ventilation line 50, which valve is configured to control the flow of ambient air through the emergency ventilation line 50, i.e., to open the emergency ventilation line 50 if required for ambient air to flow through.

A further trim air line 54 branches off from the trim air line 46. The further trim air line 54 is connectable to an aircraft area to be heated, which is not shown in the FIGURE, so that hot compressed ambient air can be supplied to the aircraft area to be heated via the further trim air line 54, bypassing the mixing chamber 16 of the aircraft air conditioning system 10. To control the flow of hot compressed ambient air through the further trim air line 54, a further trim air valve 56 is preferably arranged in the further trim air line 54.

The aircraft air conditioning system 10 further comprises a cabin exhaust air line 58 configured to have cabin exhaust air flow through it. A first end of the cabin exhaust air line 58 is connectable to the aircraft area 17 to be air conditioned. A cabin exhaust air turbine 60 is arranged in the cabin exhaust air line 58, which turbine is driven by the cabin exhaust air flowing through the cabin exhaust air line 58. When it flows through the cabin exhaust air turbine 60, the cabin exhaust air is expanded and consequently cooled. The cabin exhaust air turbine 60 is coupled to the second ambient air compressor 22 to drive the second ambient air compressor 22. In particular, the cabin exhaust air turbine 60 and the second ambient air compressor 22 are arranged on a common shaft.

This arrangement makes it possible to use the cabin exhaust air removed from the aircraft cabin to drive the second ambient air compressor 22 independently of the electrically driven first ambient air compressor 18. An adequate quantity of compressed ambient air can thereby be supplied to the mixing chamber 16 of the aircraft air conditioning system 10 even in flight mode of the aircraft at great flight altitudes, when the pressure in the aircraft environment and consequently the pressure of the ambient air flowing through the ambient air supply line 12 are low.

A second end of the cabin exhaust air line 58 opens into the ram air duct 30. In the arrangement according to the FIGURE, the second end of the cabin exhaust air line 58 is connected to an ejector 62 arranged in the ram air duct 30, which ejects the cabin exhaust air flowing through the cabin exhaust air line 58 into the ram air duct 30. In particular, the ejector 62 ejects the expanded and consequently very cold cabin exhaust air flowing through the cabin exhaust air line 58 downstream of the cabin exhaust air turbine 60 at an increased velocity and increased pressure into the ram air duct 30. The ram air flowing through the ram air duct 30 is cooled thereby and the efficiency of the ram air duct 30 increased.

To control the cabin exhaust air flow through the cabin exhaust air line 58, a cabin exhaust air control valve 64 is arranged in the cabin exhaust air line 58. In particular, the cabin exhaust air control valve 64 is provided in the cabin exhaust air line 58 upstream of the cabin exhaust air turbine 60, so that the supply of cabin exhaust air to the cabin exhaust air turbine 60 can be controlled by suitable control of the cabin exhaust air control valve 64. The operation of the ambient air supply control valve 26 and the operation of the cabin exhaust air control valve 64 are controlled in a synchronized manner by the electronic control unit 27 as a function of an ambient air requirement of the aircraft air conditioning system. For example, the quantity of ambient air compressed by the second ambient air compressor 22 can be increased in response to an increased ambient air requirement of the aircraft air conditioning system 10 by suitable control of the ambient air supply control valve 26 and the cabin exhaust air control valve 64 by the electronic control unit 27. In a similar manner, the quantity of ambient air compressed by the second ambient air compressor 22 can be decreased or even reduced to zero by suitable control of the ambient air supply control valve 26 and the cabin exhaust air control valve 64 by the electronic control unit 27 if the ambient air requirement of the aircraft air conditioning system 10 declines.

Finally, a cabin exhaust air reheater 66 is arranged in the cabin exhaust air line 58 upstream of the cabin exhaust air turbine 60, i.e., between the cabin exhaust air control valve 64 and the cabin exhaust air turbine 60. The cabin exhaust air reheater 66 is thermally coupled to a second ambient air branch line 68, which branches off from the ambient air supply line 12 downstream of the ambient air compressors 18, 22 and rejoins the ambient air supply line 12 downstream of the cabin exhaust air reheater 66. A bypass valve 70 is arranged in the second ambient air branch line 68 to control the flow of compressed ambient air through the second ambient air branch line 68 and consequently the heating capacity of the cabin exhaust air reheater 66. Due to the heating of the cabin exhaust air flowing through the cabin exhaust air line 58 before it is supplied to the cabin exhaust air turbine 60, the drive energy potential of the cabin exhaust air turbine 60 can be increased. Moreover, the risk that the cabin exhaust air flowing through the cabin exhaust air line 58 in the area of an inlet or an outlet of the cabin exhaust air turbine 60 contains liquid water is reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system, comprising:
    an ambient air supply line configured to have ambient air flow therethrough and comprising a first end connected to an ambient air inlet and a second end connected to a mixing chamber of the aircraft air conditioning system,
    a first ambient air compressor, arranged in the ambient air supply line and being configured to compress the ambient air flowing through the ambient air supply line,
    an electrically driven air cycle machine, configured to drive the first ambient air compressor,
    a first ambient air branch line, branching off from the ambient air supply line upstream of the first ambient air compressor and rejoining the ambient air supply line downstream of the first ambient air compressor,
    a second ambient air compressor, arranged in the first ambient air branch line and being configured to compress the ambient air flowing through the first ambient air branch line,
    a cabin exhaust air line configured to have cabin exhaust air flow therethrough and having a first end connectable to an aircraft area to be air conditioned,
    a cabin exhaust air turbine, arranged in the cabin exhaust air line and being configured to be driven by the cabin exhaust air flowing through the cabin exhaust air line and being coupled to the second ambient air compressor to drive the second ambient air compressor, and
    a cabin exhaust air reheater, arranged in the cabin exhaust air line upstream of the cabin exhaust air turbine and being thermally coupled to a second ambient air branch line, branching off from the ambient air supply line downstream of the first ambient air compressor and the second ambient air compressor and rejoining the ambient air supply line downstream of the cabin exhaust air reheater, to transfer heat from the compressed ambient air flowing through the second ambient air branch line to the cabin exhaust air flow flowing through the cabin exhaust air line.

2. The aircraft air conditioning system according to claim 1, wherein a second end of the cabin exhaust air line opens into a ram air duct, wherein the second end of the cabin exhaust air line is connected to an ejector arranged in the ram air duct, wherein the ejector is configured to eject the cabin exhaust air flowing through the cabin exhaust air line into the ram air duct.

3. The aircraft air conditioning system according to claim 1, further comprising:
    a connection line, branching off from the ambient air supply line downstream of the first ambient air compressor and joining the first ambient air branch line upstream of the second ambient air compressor,
    an ambient air supply control valve, configured to control the flow of ambient air through the connection line and the first ambient air branch line, and
    an electronic controller, configured to control the operation of the ambient air supply control valve in such a way that ambient air flows through the first ambient air compressor and the second ambient air compressor, either in parallel or in series, as a function of the operating state of the aircraft air conditioning system.

4. The aircraft air conditioning system according to claim 3, wherein at least one of
    the electronic controller is configured to control the operation of the ambient air supply control valve and the operation of a cabin exhaust air control valve arranged in the cabin exhaust air line downstream of the cabin exhaust air turbine in a synchronized manner as a function of an ambient air requirement of the aircraft air conditioning system, or
    a heat exchanger is arranged in the connection line, wherein the heat exchanger is configured to cool the ambient air flowing through the connection line downstream of the first ambient air compressor before it is supplied to the second ambient air compressor.

5. The aircraft air conditioning system according to claim 1, further comprising:
    a compressor air recirculation line, branching off from the ambient air supply line downstream of the first ambient air compressor and rejoining the ambient air supply line upstream of the first ambient air compressor, and
    a compressor air recirculation valve, arranged in the compressor air recirculation line and being configured to control a flow of compressed ambient air emerging from the first ambient air compressor through the compressor air recirculation line back into the ambient air supply line downstream of the first ambient air compressor.

6. The aircraft air conditioning system according to claim 1, wherein a bypass valve is arranged in the second ambient air branch line to control the flow of compressed ambient air through the second ambient air branch line.

7. The aircraft air conditioning system according to claim 2, further comprising:
    at least one of
        an ambient air cooler arranged in the ambient air supply line downstream of the first ambient air compressor and the second ambient air compressor, wherein the ambient air cooler is thermally coupled to the ram air duct, to transfer heat from the compressed ambient air flowing through the ambient air supply line to a ram air flow flowing through the ram air duct, or
        an ambient air reheater arranged in the ambient air supply line, downstream of the ambient air cooler,
    a condenser arranged in the ambient air supply line, downstream of the ambient air reheater,
    a water separator arranged in the ambient air supply line, downstream of the condenser, and
    an ambient air turbine arranged in the ambient air supply line, downstream of the water separator, wherein the ambient air turbine is coupled to the first ambient air compressor to drive the first ambient air compressor.

8. The aircraft air conditioning system according to claim 7, wherein at least one of
the ambient air reheater is thermally coupled to a section of the ambient air supply line which is arranged downstream of the water separator, to transfer heat from the ambient air flow that flows through the section of the ambient air supply line which is arranged downstream of the water separator to the ambient air flow flowing through the ambient air reheater, or
the condenser is thermally coupled to a section of the ambient air supply line which is arranged downstream of the ambient air turbine to transfer heat from the ambient air flow flowing through the condenser to the ambient air flow that flows through the section of the ambient air supply line which is arranged downstream of the ambient air turbine.

9. The aircraft air conditioning system according to claim 7, further comprising at least one of:
a ventilation line, which branches off from the ambient air supply line upstream of the ambient air turbine and upstream of the ambient air reheater and rejoins the ambient air supply line downstream of the ambient air turbine, wherein a ventilation valve is arranged in the ventilation line and is configured to control the flow of ambient air through the ventilation line,
a trim air line, which branches off from the ambient air supply line between the first ambient air compressor and the ambient air cooler and rejoins the ambient air supply line downstream of the ambient air turbine, wherein a trim air valve is arranged in the trim air line and is configured to control the flow of hot compressed ambient air through the trim air line,
an emergency ventilation line, which connects the ambient air inlet to the mixing chamber of the aircraft air conditioning system, wherein an emergency ventilation valve is arranged in the emergency ventilation line and is configured to control the flow of ambient air through the emergency ventilation line, and
a further trim air line branching off from the trim air line, which further trim air line is connectable to an aircraft area to be heated, wherein a further trim air valve is arranged in the further trim air line and is configured to control the flow of hot compressed ambient air through the further trim air line.

10. A method for operating an aircraft air conditioning system with the steps:
conducting ambient air through an ambient air supply line, which comprises a first end connected to an ambient air inlet and a second end connected to a mixing chamber of the aircraft air conditioning system,
compressing the ambient air flowing through the ambient air supply line in a first ambient air compressor arranged in the ambient air supply line,
driving the first ambient air compressor by an electrically driven air cycle machine,
conducting ambient air through a first ambient air branch line, which branches off from the ambient air supply line upstream of the first ambient air compressor and rejoins the ambient air supply line downstream of the first ambient air compressor,
compressing the ambient air flowing through the first ambient air branch line in a second ambient air compressor arranged in the first ambient air branch line,
conducting outgoing cabin exhaust air through a cabin exhaust air line, which has a first end connectable to an aircraft area to be air conditioned,
driving a cabin exhaust air turbine arranged in the cabin exhaust air line and coupled to the second ambient air compressor by the cabin exhaust air flowing through the cabin exhaust air line,
driving the second ambient air compressor by the cabin exhaust air turbine,
transferring heat from the compressed ambient air flowing through a second ambient air branch line to the cabin exhaust air flow flowing through the cabin exhaust air line by a cabin exhaust air reheater arranged in the cabin exhaust air line upstream of the cabin exhaust air turbine, wherein the cabin exhaust air reheater is thermally coupled to the second ambient air branch line, which branches off from the ambient air supply line downstream of the first ambient air compressor and the second ambient air compressor and rejoins the ambient air supply line downstream of the cabin exhaust air reheater.

11. The method according to claim 10, wherein a second end of the cabin exhaust air line opens into a ram air duct and is connected to an ejector arranged in the ram air duct, where the ejector ejects the cabin exhaust air flowing through the cabin exhaust air line into the ram air duct.

12. The method according to claim 10, further comprising:
conducting of ambient air through a connection line, which branches off from the ambient air supply line downstream of the first ambient air compressor and joins the first ambient air branch line upstream of the second ambient air compressor,
controlling the flow of ambient air through the connection line and the first ambient air branch line by an ambient air supply control valve, and
controlling the operation of the ambient air supply control valve so that ambient air flows through the first ambient air compressor and the second ambient air compressor in parallel or in series as a function of the operating state of the aircraft air conditioning system.

13. The method according to claim 12, wherein at least one of
the operation of the ambient air supply control valve and the operation of a cabin exhaust air control valve arranged in the cabin exhaust air line downstream of the cabin exhaust air turbine are controlled in a synchronized manner as a function of an ambient air requirement of the aircraft air conditioning system, or
a heat exchanger is arranged in the connection line, which cools the ambient air flowing through the connection line downstream of the first ambient air compressor before it is supplied to the second ambient air compressor.

14. The method according to claim 10, further comprising:
conducting compressed ambient air emerging from the first ambient air compressor through a compressor air recirculation line, which branches off from the ambient air supply line downstream of the first ambient air compressor and rejoins the ambient air supply line upstream of the first ambient air compressor, and
controlling a flow of compressed ambient air emerging from the first ambient air compressor through the compressor air recirculation line back into the ambient air supply line downstream of the first ambient air compressor by a compressor air recirculation valve arranged in the compressor air recirculation line.

15. The method according to claim 10, wherein the flow of compressed ambient air through the second ambient air branch line is controlled by a bypass valve arranged in the second ambient air branch line.

* * * * *